Patented June 5, 1928.

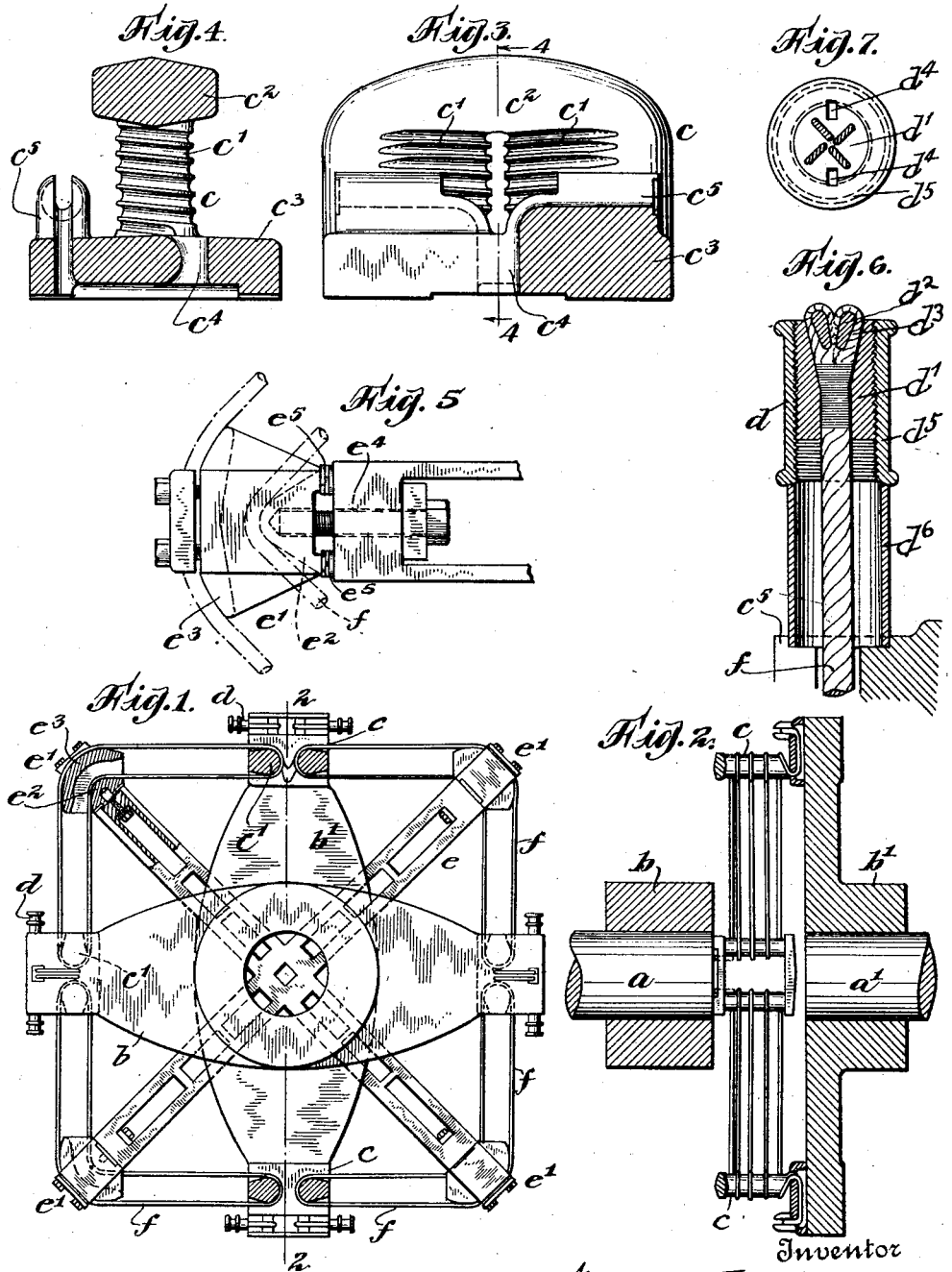

1,672,398

UNITED STATES PATENT OFFICE.

MICHAEL TRESCHOW, OF COPENHAGEN, DENMARK.

SHAFT COUPLING.

Application filed February 16, 1927, Serial No. 168,504, and in Denmark March 20, 1926.

The object of this invention is to provide an improved coupling for the coupling of two shafts which may or may not be in line and may or may not be subject to relative displacement either axially or laterally to a limited extent. The driving effort is transmitted through ropes or similar flexible elements under tension. In accordance with the invention, there is interposed between the two shafts a freely floating element which is connected by tension members with both shafts, such tension members being flexible so that they can be taken up more or less as conditions require and provisions being made for taking up such flexible tension members and for securing their ends.

The invention will be explained more fully hereinafter with reference to the accompanying drawing in which it is illustrated and in which:

Figure 1 is a view in elevation of the improved coupling as seen from a point in the line of the shaft axis, some parts being shown in section and the shafts being omitted.

Figure 2 is a view in section on the plane indicated by the broken line 2—2 of Figure 1, the shafts being shown as broken off.

Figure 3 is a detail view in sectional elevation and on a larger scale of one of the rope bearing members at the end of one of the shaft arms.

Figure 4 is a view in section on the plane indicated by the broken line 4—4 of Figure 3.

Figure 5 is a detail view in elevation of one of the rope bearing members carried by the floating element.

Figure 6 is a detail view in sectional elevation and on a still larger scale of the device for securing the end of the rope and for taking up slack.

Figure 7 is an end view of the device shown in Figure 6.

The two shafts to be coupled are indicated at $a$ and $a'$ in Figure 2 and each is shown as having secured at its end a double arm $b$, $b'$, each of which is extended across the axis of the shaft to an equal extent on both sides of such axis. The two arms $b$, $b'$ are disposed at right angles to each other, as shown in Figures 1 and 2. At each end of each arm $b$ and $b'$ is secured a rope bearing block or member $c$, the preferred construction of which is shown in detail in Figures 4 and 5. As there shown each block has two transversely grooved bearing studs $c'$, bridged at their outer ends as at $c^2$. The base or body $c^3$ has an opening $c^4$ large enough to permit the passage of two ropes hereinafter mentioned, and is formed with two slotted lugs $c^5$ for the support of the rope tightening and securing devices $d$, hereinafter described.

Between the two shafts $a$, $a'$ is a floating element $e$, that is, an element which is not fixed to either shaft, is not directly supported by either shaft, and is capable of limited displacement with respect to each shaft, laterally, axially and angularly. This floating member may have any convenient form, but for lightness and convenience in manufacture, it may be formed as a cross, having at the end of each arm a bearing member $e'$ for the rope or flexible element hereinafter mentioned. For convenience in application of the ropes, the bearing member $e'$ is preferably formed with an inner bearing $e^2$ and an outer bearing $e^3$. It is also so mounted at the end of the cross arm as to permit adjustment for the purpose of regulating the tension of the ropes. As shown, the bearing member is held to the end of the arm by a bolt $e^4$ and adjustment of the bearing member and of the tension of the ropes is effected by using wedges between the end of the arm and the bearing member to force the bearing member more or less from the end of the arm, then inserting shims, as at $e^5$, between the bearing member and the end of the arm, and finally setting up the bolt $e^4$ to hold the bearing member tightly against the end of the arm with the interposed shims.

When the coupling is ready for use, the two shafts are so placed that the two arms $b$, $b'$ are at right angles. The floating member $e$ being in position, a rope $f$, having one end made fast to one of the securing devices $d$, on one of the arms, as $b'$, passes down through the bearing block $c$ and then up through the opening $c^4$ in the same and has a quarter turn about one of the studs $c'$, then passes over the inner bearing $e^2$ at the end of one of the arms of the cross, then about one of the studs $c'$ of the bearing block $c$ at the end of the arm $b$, then over the outer bearing $e^3$, and then again about the first stud $c'$, this being continued until the requisite number of strands is provided, when the other end of the rope is made fast at the securing device of the second block $c$.

In a similar manner the several ropes $f$ are applied and secured, each rope being placed under the proper tension by adjustment of the securing devices $d$ at the ends thereof and by adjustment of the bearing member $e'$, as already described.

A suitable form of device for securing each end of the rope is shown in detail in Figures 6 and 7. In the form of device there shown, the end of the rope $f$ is passed through a sleeve $d'$, the bore of which is cored out at its end, the sleeve itself being threaded externally. The end of the rope is stranded and the ends of the strands turned in over a suitable core, indicated at $d^2$, to form a head $d^3$ which cannot be drawn through the sleeve $d'$. The sleeve $d'$ may be notched at its end, as at $d^4$, for engagement by a suitable tool to hold it from turning. On the sleeve $d'$ is threaded a sleeve $d^5$ which may rest against the end of the lug $c^5$ or against an interposed sleeve $d^6$, of greater or less length. By rotating the sleeve $d^5$ while the sleeve $d'$ is held from rotation, the sleeve $d'$ may be moved outward from the lug $c^5$ to take up more or less the rope $f$.

It will now be seen that through the connection of the two shafts by flexible tension members, provision is made for the transmission of driving effort regardless of relative displacement within reasonable limits of the two shafts either axially or laterally or angularly, that by reason of the fact that effort is transmitted from one shaft to the other through tension members only, the floating member will always adjust itself to position between the two shafts, tending to assume a position of equilibrium, and that as the coupling is practically frictionless, the loss of energy will be negligible.

I claim as my invention:

A shaft coupling comprising double arms secured respectively to the shafts to be coupled, a bearing stud mounted at each end of each arm, a floating member, double bearing blocks mounted on the floating member, and flexible connectors each being secured at one end to one of said arms and at the other end to the other of said arms passed about the bearing studs on the two arms and bearing alternately on the bearing surfaces of the double bearing blocks.

This specification signed this 14th day of January A. D. 1927.

MICHAEL TRESCHOW.